United States Patent [19]

Nelle

[11] Patent Number: 5,182,867
[45] Date of Patent: Feb. 2, 1993

[54] POSITION MEASURING APPARATUS

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 878,231

[22] Filed: May 4, 1992

[30] Foreign Application Priority Data

May 11, 1991 [EP] 05111991 ............. 91107677.6

[51] Int. Cl.$^5$ ............................................. G01B 11/04
[52] U.S. Cl. ............................................ 33/702; 33/705
[58] Field of Search ............ 33/702, 704, 705, DIG. 19

[56] References Cited

U.S. PATENT DOCUMENTS

| 4,593,471 | 6/1986 | Nelle | 33/702 |
| 5,050,311 | 9/1991 | Nelle | 33/702 X |
| 5,065,525 | 11/1991 | Szenger | 33/702 |

FOREIGN PATENT DOCUMENTS

| 0126888 | 12/1984 | European Pat. Off. |
| 2853771 | 6/1980 | Fed. Rep. of Germany |
| 8509844 | 6/1985 | Fed. Rep. of Germany |
| 3918490 | 9/1990 | Fed. Rep. of Germany |
| 8903506 | 4/1989 | PCT Int'l Appl. |

Primary Examiner—Harry N. Haroian
Attorney, Agent, or Firm—Anderson Kill Olick & Oshinsky

[57] ABSTRACT

A position measuring apparatus is described wherein a probing unit is connected with a first object and probes the graduation of a measuring scale which is arranged upon a support member. The support member is fastened to a second object. The support member and the second object have different coefficients of thermal expansion. The support member is rigidly connected with an auxiliary support member. The coefficient of thermal expansion of the auxiliary support member differs from the thermal expansion coefficient of the support member. The cross-sections of the support member and the auxiliary support member are chosen so that the resulting coefficient of thermal expansion of the structural combination of the support member and the auxiliary support member is substantially equal to the coefficient of thermal expansion of the second object.

15 Claims, 2 Drawing Sheets

POSITION MEASURING APPARATUS

FIELD OF THE INVENTION

The present invention deals with a position measuring apparatus for measuring the relative position of two objects wherein the thermal expansion coefficient of the position measuring apparatus can be chosen so as to be substantially equal to the thermal expansion coefficient of an object being measured. This serves to minimize and/or reduce measurement inaccuracies which results from temperature changes which may occur and which may effect the lengths of the components of the apparatus and/or the object being measured. Such a position measuring apparatus is utilized, in particular, in processing machines for measuring the relative position of a tool bit with respect to a workpiece.

BACKGROUND OF THE PRESENT INVENTION

In a position measuring apparatus for measuring the relative position of two objects, such as two machine parts of a processing machine, a probe connected to a first object probes a measuring instrument or scale, which is arranged on a support member. The support member is in turn connected to a second object.

While the second object, which is typically a machine part, generally consists of gray iron or steel, aluminum is preferably used for the support member of the measuring scale, since the support member with its complicated cross-sectional profile, especially in an encapsulated positioning measuring apparatus, can be most economically produced by extrusion processes.

If the aluminum support member is fastened rigidly, such as by screws, to the machine part of gray iron or steel considerable longitudinal forces are generated in the support member which experiences temperature changes because of the very different coefficients of thermal expansion of the support member and the machine part. The presence of different thermal expansion coefficients is unavoidable during the machining process. Further, these longitudinal forces can cause indefinite displacements of the support member in the screw connections, which entails origin, or zero point, changes in the measuring scale and non-reproducible stresses in the measuring scale along with the associated measurement irregularities.

A position measuring arrangement is described in DE-OS 28 53 771, wherein one support member, in the shape of a housing for the measuring scale, and the probing unit, is connected at both ends with one machine part by means of two fastening elements. While the one end of the housing is connected directly with the first fastening or attachment element, a length compensation element for temperature compensation is arranged between the other end of the housing and the second fastening element, so that the end of the housing is supported with a translatory degree of freedom in the longitudinal direction. This relatively expensive type of attachment of the support member for the measuring scale to origin, of the measuring scale must lie at the point of attachment of the support member to the first attachment element.

SUMMARY OF THE PRESENT INVENTION

The present invention provides a positional measuring apparatus which adapts a support member for the measuring scale in a simple manner to the thermal expansion behavior of an object to be measured.

The present invention comprises a support member for a measuring scale which undergoes the same temperature-dependent length changes as an associated object, in spite of the fact that the two objects have different coefficients of thermal expansion. A support member and an auxiliary support member are utilized in the present invention and are configured together so that their structural combination has a resultant coefficient of thermal expansion which, despite the differing materials, coincides with or is substantially equal to the thermal expansion coefficient of an object to be measured. In this manner, the measurement inaccuracies caused by temperature changes are avoided or significantly reduced. Since the support member and the object have identical temperature behavior, the attachment of the support member to this object is made possible in a simple manner, such as by means of screw connections. In addition, the zero point of the measuring scale can be selected in a random fashion depending on the application.

The measurement scale utilized consists of a base member and a graduation carrier with a graduation attached thereon and which is fastened to a machine part. The base member and the graduation carrier have differing coefficients of thermal expansion. The graduation carrier is frictionally connected to the base member by a galvanically precipitated intermediate layer and the cross-sections of the graduation carrier and the base member are dimensioned in such a way, that the resultant coefficient of thermal expansion of the structural unit is equal to the coefficient of thermal expansion of an object being measured.

It is an object of the present invention to provide a position measuring apparatus for measuring the relative position of two objects which reduces measurement inaccuracies caused by temperature changes and the different coefficients of thermal expansion of the various components utilized or measured in and by the position measuring apparatus.

Other objects and advantages of the present invention will be made apparent to those skilled in the art after a review of the Description of the Preferred Embodiment taken in conjunction with the drawings which follow.

DESCRIPTION OF THE PREFERRED EMBODIMENT

Figure 1:
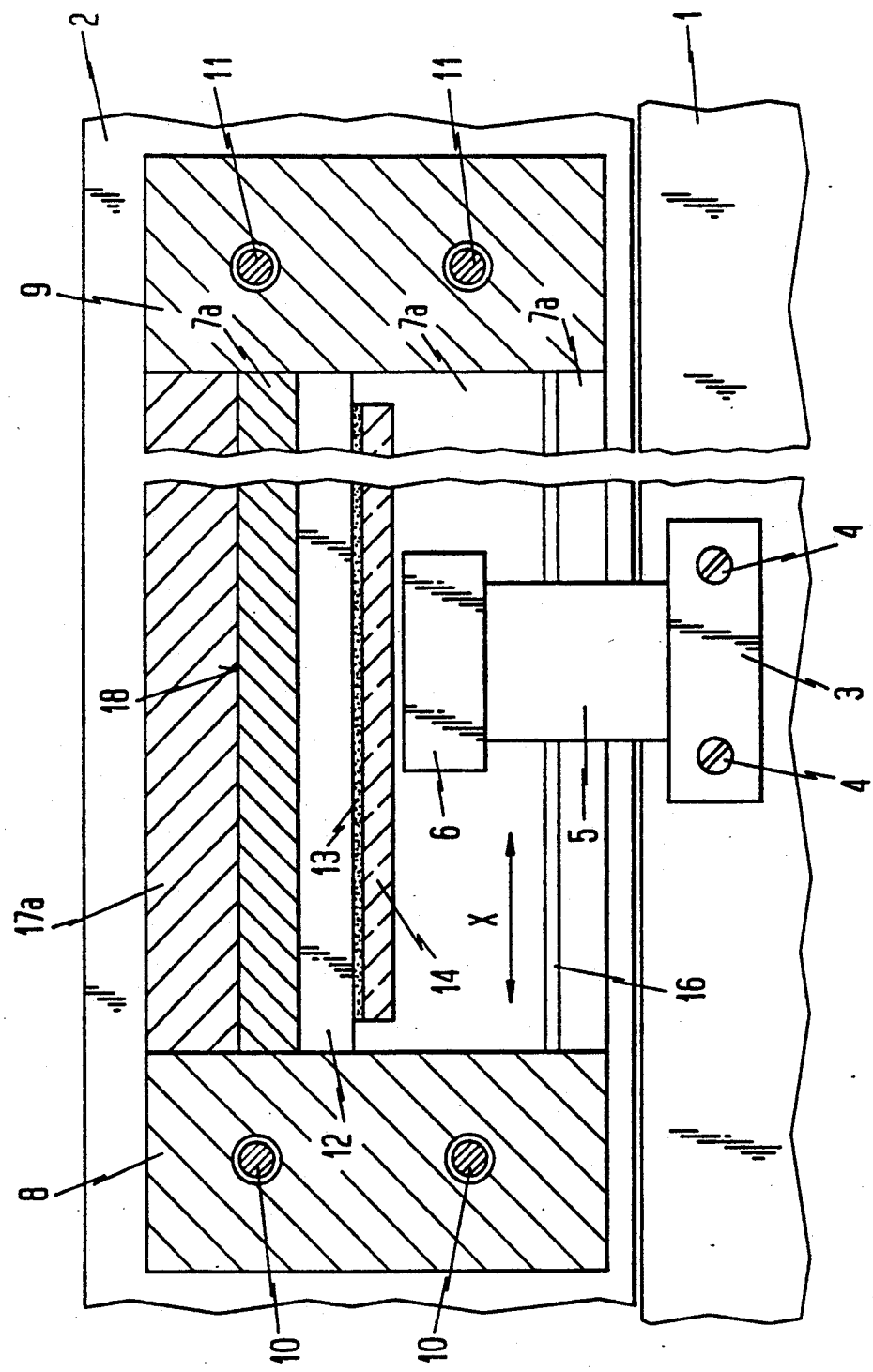
FIG. 1 illustrates a longitudinal view of a position measuring apparatus having a first support member and an auxiliary support member.
Figure 2:
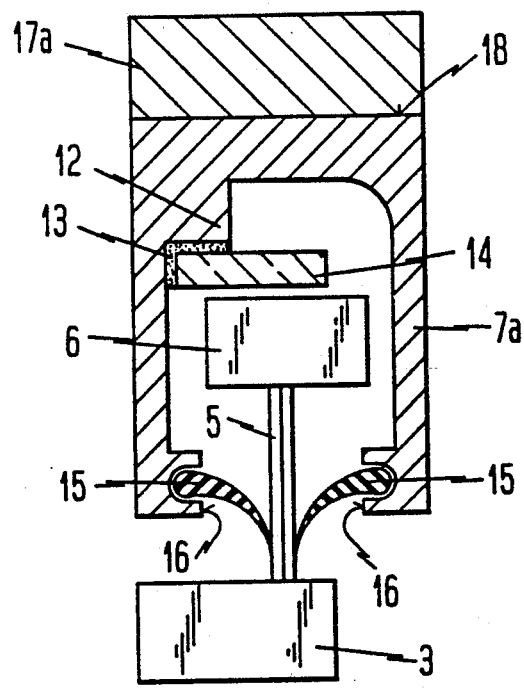
FIG. 2 illustrates, in cross section, the position measurement arrangement of FIG. 1.

FIG. 1 illustrates a position measuring apparatus for measuring the relative position between two objects and which is denoted generally by reference numeral 100. FIG. 1 illustrates a longitudinal view of the position measuring apparatus 100 while FIG. 2 illustrates the position measuring apparatus 100 in cross-section.

The objects, the relative position of which is measured, are denoted by the reference numerals 1 and 2 as shown in FIG. 1. Referring to FIG. 1, mounting piece 3 is fastened by means of screws 4 to the first object 1 which is in the form of a bed of a processing machine (not shown). Mounting piece 3 is connected to a probing unit 6 via a twin sword-shaped follower or driver 5.

A support member 7a, which is in the form of a housing and which is U-shaped in cross-section (see FIG. 2) is fastened via each fastening element 8, 9 by screws 10, 11 to the second object 2 which is in the shape of a sliding carriage (not shown) of the position measuring apparatus 100. These two fastening elements 8, 9 constitute the end face termination of the two ends of the support member 7a and may be rigidly connected thereto in any desired manner.

A measuring scale 14, having graduations, is arranged inside the support member 7a and on an inner web 12 by means of a bonding layer 13. In this manner, the measuring scale 14 is slightly displaceable in measuring direction X as shown in FIG. 1. The graduations of the measuring scale 14 are probed by a probing unit 6 which is located inside the support member 7a.

Referring now to FIG. 2, the driver 5, which is associated with the probing unit 6 protrudes through a longitudinal slot 16 in the support member 7a with said slot 16 closed by two sealing lips 15. The second object 2, which is usually in the form of the sliding carriage of the position measuring apparatus 100, is composed of steel which has a coefficient of thermal expansion which equals $11 \times 10^{-6} K^{-1}$. The support member 7a which supports the measuring scale 14 is usually comprised of aluminum which has a coefficient of thermal expansion $\alpha_{Al}$ which equals $22 \times 10^{-6} K^{-1}$. Since unavoidable temperature changes may occur during a position measurement process, the second object 2 and the support member 7a are subjected to different changes in length which results from their differing coefficients of thermal expansion $\alpha_{ST}$, $\alpha_{AL}$, respectively. This change in length results in displacements in the screw connections 10, 11 of the two fastening elements 8, 9, which may result in measurement inaccuracies.

The present invention reduces the negative effects of the aforementioned length differences in the following manner. The support member 7a, which is composed of aluminum, is rigidly connected at its end face 18 to an auxiliary support member 17a which is composed of invar and which is in the form of a plate. The auxiliary support member 17a can be formed from a single component or from more than one components. Auxiliary support member 17a has a coefficient of thermal expansion, $\alpha_{In}$ which is equal to $1 \times 10^{-6} K^{-1}$. It can be easily seen that the coefficient of thermal expansion of the auxiliary support member 17a, denoted as $\alpha_{In}$, differs greatly from the coefficient of thermal expansion of the support member 7a which is denoted $\alpha_{Al}$. This rigid connection established between support member 7a and the auxiliary support member 17a can be effected in any number of ways such as by hard bonding, riveting or by being connected by means of screws or other similar fastening means. The structural combination of the support member 7a and the auxiliary support member 17a may be alternately referred to as the support structure.

In accordance with the two thermal expansion coefficients $\alpha_{Al}$, $\alpha_{In}$ and the two moduli of elasticity $E_{AL}$, $E_{In}$ of the support member 7a and the auxiliary support member 17a, respectively, the cross-sections $F_{AL}$, $F_{In}$ of the support member 7a and the auxiliary support member 17a, respectively, are chosen in such a manner, that the resulting coefficient of thermal expansion $\alpha_{res}$, of the structural combination of the support member 7a and the auxiliary support member 17a, is equal to, or substantially equal to, the coefficient of thermal expansion of the second object 2 which is denoted $\alpha_{St}$. With the coefficient of thermal expansion of the structural combination of the support member 7a and the auxiliary support member 17a, denoted $\alpha_{res}$, and the coefficient of thermal expansion of the second object 2, denoted $\alpha_{St}$, being equal to, or substantially equal to, one another, measurement inaccuracies brought about due to temperature changes can be greatly reduced.

By choosing a support member 7a and an auxiliary support member 17a having predetermined coefficients of thermal expansion, moduli of elasticity, and cross-sectional dimensions, a structural combination of the support member 7a and the auxiliary support member 17a or the support structure can be provided which has a thermal expansion coefficient $\alpha_{res}$, which is equal to, or substantially equal to, the thermal expansion coefficient of the second object employed in the position measuring apparatus.

An illustrative example of how the present invention accomplishes the above described function for a second object 2 which has a coefficient of thermal expansion $\alpha_{St}$ equal to $11 \times 10^{-6} K^{-1}$ follows. Equation 1 provides the relationship between the thermal expansion coefficient for the structural combination of the support member 7a and the auxiliary support member 17a, or support structure, denoted $\alpha_{res}$, and the thermal expansion coefficients, $\alpha_{Al}$, $\alpha_{In}$ moduli of elasticity $E_{Al}$, $E_{In}$ and cross-sectional dimensions $F_{Al}$, $F_{In}$ for the support member 7a and the auxiliary support member 17a, respectively:

$$\alpha_{res} = \frac{F_{Al}E_{Al}\alpha_{Al} + F_{In}E_{In}\alpha_{In}}{F_{Al}E_{Al} + F_{In}E_{In}} = 11.3 \times 10^{-6} K^{-1} \quad (1)$$

In a preferred embodiment having the thermal expansion coefficients as given above, moduli of elasticity for the support member 7a, $E_{Al}$, equal to $70 \times 10^3 N/mm^2$, a modulus of elasticity of the auxiliary support member 17a, $E_{In}$, equal to $145 \times 10^3 N/mm^2$ and a ratio of cross-sectional dimensions $F_{Al}/F_{In}$ for the support member 7a and the auxiliary support member 17a, respectively, equal to 2:1, a resulting thermal coefficient, $\alpha_{res}$, for the structural combination of the support member 7a and the auxiliary member 17a can be found to have a value of $11.3 \times 10^{-6} K^{-1}$ which is substantially equal to the thermal expansion coefficient $\alpha_{St}$ for the second object 2 which was above chosen to be equal to $11 \times 0^{-6} K^{-1}$.

In this manner, the associated characteristics for the support member 7a and for the auxiliary support member 17a can be chosen so that their structural combination yields a resultant coefficient of thermal expansion $\alpha_{res}$ which is equal to, or substantially equal to, the coefficient of thermal expansion of the second object 2 which is being measured. Therefore, temperature changes will have little, if any, effect on the components of the position measuring apparatus and upon the second object 2 and, therefore, measurement inaccuracies will be minimized and/or significantly reduced.

Figure 3:
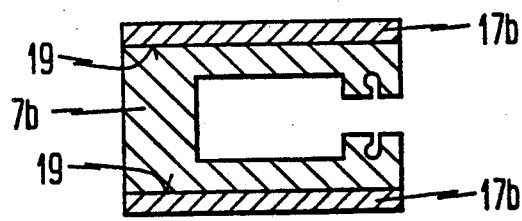
FIG. 3 illustrates an alternate embodiment for a support member along with an alternate embodiment for an auxiliary support member shown in cross-section.

FIG. 3 illustrates an alternative support member 7b which can be utilized in the position measuring apparatus of the present invention. In the embodiment of FIG. 3, the support member 7b is rigidly connected at its two faces 19 to a two-part auxiliary support 17b as shown. By utilizing the characteristics associated with the structural combination of the support member 7b and the two-part auxiliary support member 17b, a resultant thermal expansion coefficient $a_{res}$ can be obtained.

Figure 4:
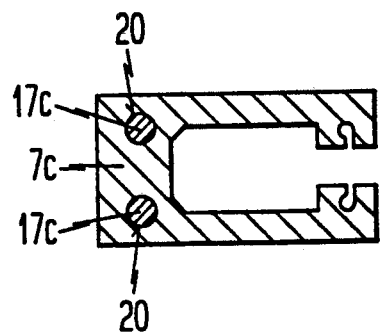
FIG. 4 illustrates a third embodiment for a support member along with an associated alternate embodiment for an auxiliary support member shown in cross-section.

FIG. 4 illustrates yet a third alternate embodiment comprising support member 7c which can also be utilized in the position measuring apparatus of the present invention. In the embodiment of FIG. 4, the support member 7c is rigidly connected in two longitudinal recesses 20 with a two-part auxiliary support member 17c which is in the form of two rods as shown. In a manner similar to that previously described, a resultant thermal expansion coefficient $a_{res}$ can be obtained for the structural combination of the support member 7c and the auxiliary support member 17c for the configuration of FIG. 4.

It should be noted that the second object 2, the support members 7a, 7b, 7c and the auxiliary supports 17a, 17b, 17c of the various embodiments or configurations of the present invention may comprise different pairs of materials having different geometries, different thermal expansion coefficients, different moduli of expansion and different cross-sectional dimension ratios. In this manner, various combinations of elements having various compositions can be employed in the position measurement apparatus of the present invention. It should also be noted that the relatively simple cross-sections of the auxiliary support members 17a, 17b and/or 17c, compared to the relatively complicated crosssections of the support members 7a, 7b, and/or 7c, respectively, facilitates a simple manufacture of the structural combination of these structures.

While the present invention has been described herein in various preferred embodiments, such descriptions are only illustrative of the present invention and are not meant to be a limitation thereof. Accordingly, the present invention encompasses any and all modifications and/or variations of the apparatus described herein with the scope of the present invention limited only by the claims which follow.

I claim:

1. A position measuring apparatus, for measuring the relative position of two objects, in an encapsulated position measuring arrangement, which comprises:
   a probing means which is connected to a first object;
   a support member which is connected to a second object wherein said support member and said second object have different coefficients of thermal expansion;
   a measurement means arranged on said support member wherein said probing means probes said measurement means;
   an auxiliary support member rigidly connected to said support member wherein said auxiliary support member is characterized by a coefficient of thermal expansion which is different from the coefficient of thermal expansion of said support member and further, wherein the cross-sectional dimensions of said auxiliary support member and said support members are determined so that a resulting structural combination of said auxiliary support member and said support member has a coefficient of thermal expansion which is substantially equal to the coefficient of thermal expansion of said second object.

2. The position measuring apparatus of claim 1, wherein said auxiliary support member is formed of a single component.

3. The position measuring apparatus of claim 1, wherein said auxiliary support member is formed of more than one component.

4. The position measuring apparatus of claim 1, wherein the support member is rigidly connected at its end face with a single part auxiliary support member and further wherein said auxiliary support member is in the form of a plate.

5. The position measuring apparatus of claim 1, wherein said support member is rigidly connected at least two side faces with an auxiliary support member wherein said auxiliary support member is comprised of two plates.

6. The position measuring apparatus of claim 1, wherein said support member is rigidly connected in two longitudinal recesses with said auxiliary support member and further wherein said auxiliary support member is comprised of two rods.

7. The position measuring apparatus of claim 1, wherein said support member is composed of aluminum.

8. The position measuring apparatus of claim 1, wherein said auxiliary support member is composed of invar.

9. The position measuring apparatus of claim 1, wherein said support member is composed of a plastic material.

10. The position measuring apparatus of claim 1, wherein said auxiliary support member is composed of steel.

11. The position measuring apparatus of claim 1, wherein said support member is composed of aluminum and said auxiliary support member is composed of invar.

12. The position measuring apparatus of claim 1, wherein said support member is composed of a plastic material and said auxiliary support member is composed of steel.

13. The position measuring apparatus of claim 1, wherein said support member and the auxiliary support member are connected by means of a screw.

14. The position measuring apparatus of claim 1, wherein said support member and said auxiliary support member are connected by means of a rivet.

15. The position measuring apparatus of claim 1, wherein said support member and said auxiliary support member are connected by means of a hard bond.

* * * * *